United States Patent
Glaser et al.

(10) Patent No.: US 12,397,829 B2
(45) Date of Patent: Aug. 26, 2025

(54) SELECTIVE VEHICLE SLOWDOWN

(71) Applicant: GM Global Technology Operations LLC, Detroit, MI (US)

(72) Inventors: Daniel S. Glaser, Novi, MI (US); Joseph F. Szczerba, Grand Blanc, MI (US); Sri Krishna Divya Pemmaraju, Plymouth, MI (US); Yi Guo Glaser, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 173 days.

(21) Appl. No.: 18/496,061

(22) Filed: Oct. 27, 2023

(65) Prior Publication Data

US 2025/0136150 A1    May 1, 2025

(51) Int. Cl.
*B60W 60/00* (2020.01)
*B60W 40/08* (2012.01)
(Continued)

(52) U.S. Cl.
CPC ........ *B60W 60/0016* (2020.02); *B60W 40/08* (2013.01); *B60W 50/14* (2013.01);
(Continued)

(58) Field of Classification Search
CPC .. B60W 60/0016; B60W 40/08; B60W 50/14; B60W 60/0053; B60W 2040/0881; B60W 2050/0073; B60W 2050/0083; B60W 2050/146; B60W 2420/403; B60W 2540/01; B60W 2540/215; B60W 2540/227; G06V 40/10
See application file for complete search history.

(56) References Cited

U.S. PATENT DOCUMENTS

| 6,647,328 B2 * | 11/2003 | Walker | B60T 8/4266 |
| | | | 701/2 |
| 8,374,743 B2 * | 2/2013 | Salinger | G05D 1/0246 |
| | | | 701/28 |

(Continued)

FOREIGN PATENT DOCUMENTS

CN    103359123 A    * 10/2013

OTHER PUBLICATIONS

Machine translation of CN 103359123 downloaded from Espacenet Jun. 12, 2025 (Year: 2025).*

(Continued)

*Primary Examiner* — Kito R Robinson
*Assistant Examiner* — Tanya C Sienko
(74) *Attorney, Agent, or Firm* — Vivacqua Crane, PLLC

(57) ABSTRACT

A system for initiating an automated slowdown procedure within a vehicle includes a system controller adapted to detect a request for initiation of an automated slowdown procedure, a human machine interface (HMI), wherein the system controller is adapted to prompt, via the HMI, the driver of the vehicle for verification to initiate the automated slowdown procedure, and a vehicle control module, wherein the system controller is adapted to initiate, via the vehicle control module, the automated slowdown procedure when either one of the driver provides, via the HMI, verification to initiate the automated slowdown procedure, or a response from the driver is not received within a pre-determined time.

20 Claims, 6 Drawing Sheets

(51) Int. Cl.
*B60W 50/00* (2006.01)
*B60W 50/14* (2020.01)
*G06V 20/59* (2022.01)
*G06V 40/10* (2022.01)

(52) U.S. Cl.
CPC ....... *B60W 60/0053* (2020.02); *G06V 20/593* (2022.01); *G06V 40/10* (2022.01); *B60W 2040/0881* (2013.01); *B60W 2050/0073* (2013.01); *B60W 2050/0083* (2013.01); *B60W 2050/146* (2013.01); *B60W 2420/403* (2013.01); *B60W 2540/01* (2020.02); *B60W 2540/215* (2020.02); *B60W 2540/227* (2020.02)

(56) References Cited

U.S. PATENT DOCUMENTS

| | | | | |
|---|---|---|---|---|
| 9,463,793 | B2* | 10/2016 | Lind | B60W 50/082 |
| 10,956,759 | B1* | 3/2021 | Pertsel | G06V 40/103 |
| 11,801,748 | B2* | 10/2023 | Ide | B60W 50/10 |
| 2005/0216164 | A1* | 9/2005 | Sakata | B60T 8/1755 |
| | | | | 340/440 |
| 2013/0204455 | A1* | 8/2013 | Chia | G07C 5/0858 |
| | | | | 701/1 |
| 2013/0226399 | A1* | 8/2013 | Miller | B60W 50/0098 |
| | | | | 701/36 |
| 2015/0120124 | A1* | 4/2015 | Bartels | B60W 50/10 |
| | | | | 701/23 |
| 2017/0248954 | A1* | 8/2017 | Tomatsu | B60W 50/082 |
| 2017/0297569 | A1* | 10/2017 | Nilsson | B60K 28/10 |
| 2019/0315346 | A1* | 10/2019 | Yoo | B60W 50/12 |
| 2019/0344790 | A1* | 11/2019 | Kitagawa | G08G 1/16 |
| 2020/0216086 | A1* | 7/2020 | Lenke | B60W 50/08 |
| 2020/0307631 | A1* | 10/2020 | Tsuji | B60T 17/22 |
| 2020/0307633 | A1* | 10/2020 | Naruse | B60W 60/0059 |
| 2020/0307642 | A1* | 10/2020 | Tsuji | B60W 10/04 |
| 2021/0370954 | A1* | 12/2021 | Alvarez | G06V 20/59 |
| 2022/0144307 | A1* | 5/2022 | Jung | B60W 60/005 |
| 2022/0289198 | A1* | 9/2022 | Schmitt | B60W 50/082 |
| 2024/0208496 | A1* | 6/2024 | Olsson | B60W 30/146 |
| 2024/0300536 | A1* | 9/2024 | Silva | B60W 30/16 |
| 2025/0001934 | A1* | 1/2025 | Ohsawa | B60W 50/029 |
| 2025/0065919 | A1* | 2/2025 | Yu | G07C 5/008 |

OTHER PUBLICATIONS

"Are you sure you want to do this? Microcopy for confirmation dialogues" by Kinneret Yifrah, UX Collective Medium, published May 1, 2019 (Year: 2019).*

* cited by examiner

SELECTIVE VEHICLE SLOWDOWN

INTRODUCTION

The present disclosure relates to a system and method for allowing a driver or passenger within a vehicle to initiate an automated vehicle slowdown when the driver or passenger determines that the driver is no longer able to properly operate the vehicle.

Vehicles are equipped with many sensors to monitor the driver and to take measures in response to detecting that a driver of a vehicle is distracted or otherwise no longer able to properly operate the vehicle. However, current systems do not provide the ability for the driver or a passenger within the vehicle to, upon realizing that the driver is no longer able to properly operate the vehicle, initiate an automated vehicle slowdown.

Thus, while current systems and methods achieve their intended purpose, there is a need for a new and improved system and method for providing the ability for the driver or a passenger within the vehicle to, upon realizing that the driver is no longer able to properly operate the vehicle, initiate an automated vehicle slowdown.

SUMMARY

According to several aspects of the present disclosure, a method of initiating an automated slowdown procedure within a vehicle includes providing, with a system controller, control of the vehicle to a driver of the vehicle, wherein the driver of the vehicle proceeds with driving the vehicle, detecting, with the system controller, a request for initiation of an automated slowdown procedure, prompting, with the system controller via a human machine interface (HMI), the driver of the vehicle for verification to initiate the automated slowdown procedure, and initiating, with the system controller, via a vehicle control module, the automated slowdown procedure when either one of the driver provides, via the HMI, verification to initiate the automated slowdown procedure, or a response from the driver is not received within a pre-determined time.

According to another aspect, the method further includes, prior to initiating the automated slowdown procedure, engaging an automated driving mode when the vehicle is not already in an automated driving mode.

According to another aspect, the method further includes, after initiating the automated slowdown procedure, prompting, with the system controller, via the HMI, the driver of the vehicle with an option to selectively over-ride the automated slowdown procedure, and one of continuing with the automated slowdown procedure when the driver of the vehicle does not selectively over-ride, via the HMI, the automated slowdown procedure, or returning, with the system controller, control of the vehicle to the driver of the vehicle when the driver of the vehicle selectively over-rides, via the HMI, the automated slowdown procedure.

According to another aspect, the method further includes, prior to the providing, with the system controller, control of the vehicle to the driver of the vehicle, and the driver of the vehicle proceeding with driving, receiving, with the system controller, via the HMI, preferences from the driver related to initiation of the automated slowdown procedure.

According to another aspect, the method further includes, after receiving, with the system controller, via the HMI, preferences from the driver related to initiation of the automated slowdown procedure, detecting, with an occupant monitoring system, the presence and location of passengers, in addition to the driver, within the vehicle, identifying, with the occupant monitoring system, at least one passenger located in a rear seating area of the vehicle, and determining, with the system controller, based on preferences from the driver, eligibility of the at least one passenger located in the rear seating area of the vehicle to request initiation of the automated slowdown procedure.

According to another aspect, the detecting, with the system controller, a request for initiation of an automated slowdown procedure further includes receiving, with the system controller, via a front seat actuator, a request for initiation of the slowdown procedure from at least one of the driver of the vehicle and a front seat passenger of the vehicle.

According to another aspect, the detecting, with the system controller, a request for initiation of an automated slowdown procedure further includes receiving, with the system controller, via a rear seating area actuator, a request for initiation of the slowdown procedure from the at least one passenger located in the rear seating area when the system controller determines, based on preferences from the driver, that the at least one passenger located within the rear seating area is eligible to request initiation of the automated slowdown procedure.

According to another aspect, the receiving, with the system controller, via the HMI, preferences from the driver related to initiation of the automated slowdown procedure further includes receiving preferences from the driver including at least one of disabling the rear seating area actuator, disabling both the rear seating area actuator and the front seat actuator, disabling one or both of the front seat actuator and the rear seating area actuator for a single ignition cycle, disabling the eligibility of a specific passenger to initiate a request for the vehicle slowdown procedure, and disabling the eligibility of any passenger that is less than a pre-set age.

According to another aspect, each of the front seat actuator and the rear seating area actuator is at least one of a mechanical actuator, and an icon presented on an HMI.

According to another aspect, the initiating, with the system controller, via the vehicle control module, the automated slowdown procedure further includes actuating, with the system controller, automated driving algorithms within the vehicle control module, disabling driver control of the vehicle, and causing, with the vehicle control module, the vehicle to slow down, maneuver off active lanes of a roadway on which the vehicle is traveling, and stop.

According to several aspects of the present disclosure, a system for initiating an automated slowdown procedure within a vehicle includes a system controller adapted to detect a request for initiation of an automated slowdown procedure, a human machine interface (HMI), wherein the system controller is adapted to prompt, via the HMI, the driver of the vehicle for verification to initiate the automated slowdown procedure, and a vehicle control module, wherein the system controller is adapted to initiate, via the vehicle control module, the automated slowdown procedure when either one of the driver provides, via the HMI, verification to initiate the automated slowdown procedure, or a response from the driver is not received within a pre-determined time.

According to another aspect, prior to initiating the automated slowdown procedure, the system controller is adapted to engage an automated driving mode when the vehicle is not already in an automated driving mode.

According to another aspect, after initiating the automated slowdown procedure, the system controller is further adapted to prompt, via the HMI, the driver of the vehicle with an option to selectively over-ride the automated slowdown procedure, and one of continue with the automated slowdown procedure when the driver of the vehicle does not selectively over-ride, via the HMI, the automated slowdown procedure, or return control of the vehicle to the driver of the vehicle when the driver of the vehicle selectively over-rides, via the HMI, the automated slowdown procedure.

According to another aspect, prior to detecting a request for initiation of an automated slowdown procedure, the system controller is adapted to receive, via the HMI, preferences from the driver related to initiation of the automated slowdown procedure.

According to another aspect, after receiving, via the HMI, preferences from the driver related to initiation of the automated slowdown procedure, the system controller is further adapted to detect, with an occupant monitoring system, the presence and location of passengers, in addition to the driver, within the vehicle, identify, with the occupant monitoring system, at least one passenger located in a rear seating area of the vehicle, and determine, based on preferences from the driver, eligibility of the at least one passenger located in the rear seating area of the vehicle to request initiation of the automated slowdown procedure.

According to another aspect, when detecting a request for initiation of an automated slowdown procedure, the system controller is further adapted to at least one of receive, via a front seat actuator, a request for initiation of the slowdown procedure from at least one of the driver of the vehicle and a front seat passenger of the vehicle, and receive, via a rear seating area actuator, a request for initiation of the slowdown procedure from the at least one passenger located in the rear seating area when the system controller determines, based on preferences from the driver, that the at least one passenger located within the rear seating area is eligible to request initiation of the automated slowdown procedure.

According to another aspect, the system controller, via the HMI, is adapted to receive preferences from the driver related to initiation of the automated slowdown procedure including at least one of disabling the rear seating area actuator, disabling both the rear seating area actuator and the front seat actuator, disabling one or both of the front seat actuator and the rear seating area actuator for a single ignition cycle, disabling the eligibility of a specific passenger to initiate a request for the vehicle slowdown procedure, and disabling the eligibility of any passenger that is less than a pre-set age.

According to another aspect, each of the front seat actuator and the rear seating area actuator is at least one of a mechanical actuator, and an icon presented on an HMI.

According to another aspect, when initiating, via the vehicle control module, the automated slowdown procedure, the system controller is further adapted to actuate automated driving algorithms within the vehicle control module, disable driver control of the vehicle, and cause, with the vehicle control module, the vehicle to slow down, maneuver off active lanes of a roadway on which the vehicle is traveling and stop.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
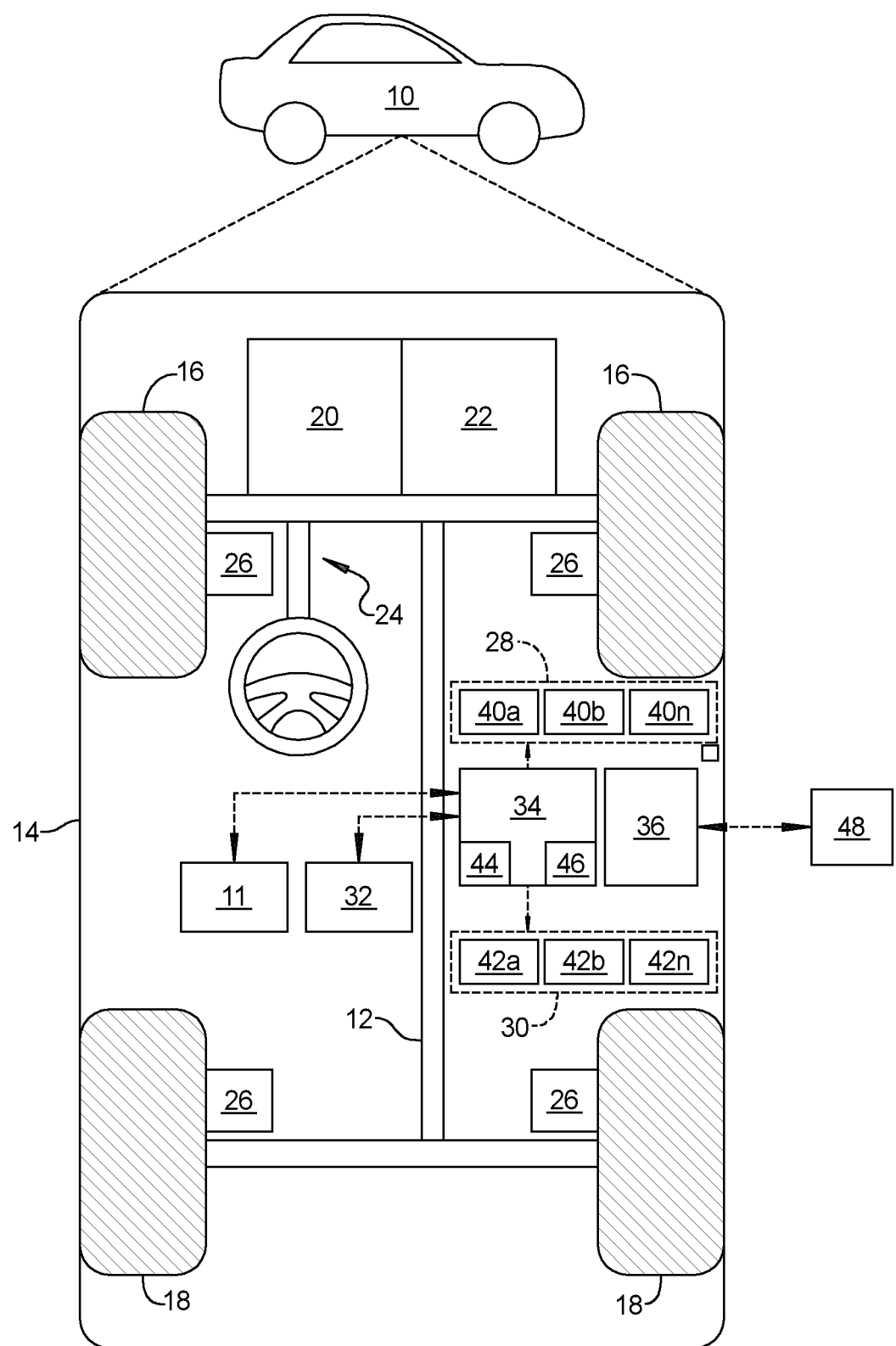
FIG. 1 is a schematic diagram of a vehicle having a system for providing a warning to an occupant of a hazardous object prior to the occupant exiting the vehicle according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for providing the ability for the driver or a passenger within the vehicle 10 to, upon realizing that the driver is no longer able to properly operate the vehicle 10, initiate an automated vehicle slowdown procedure in accordance with various embodiments. In general, the system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
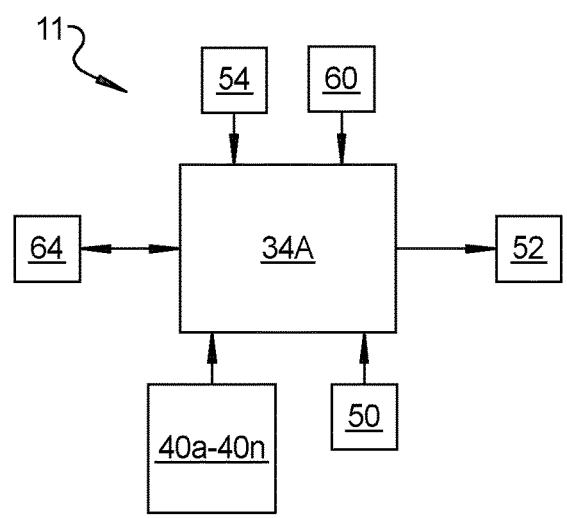
FIG. 2 is a schematic diagram of the system according to an exemplary embodiment.

Referring to FIG. 2 a schematic diagram of the system 11 is shown. The system 11 includes a system controller 34A in communication with the plurality of sensing devices (onboard sensors) 40a-40n. The system controller 34A may be the vehicle controller 34, or the system controller 34A may be a separate controller in communication with the vehicle controller 34. In addition to the plurality of onboard sensors 40a-40n, the system controller 34A is in communication with an occupant monitoring system 50, a vehicle control module 52, a front seat actuator 54, adapted to allow a driver 56 or a front seat passenger 58A to provide input to the system 11 to request an automated vehicle slowdown procedure, a rear seating area actuator 60 adapted to allow a passenger 58b seated in a rear seating area 62 of the vehicle 10 to provide input to the system 11 to request an automated vehicle slowdown procedure and a human machine interface (HMI) 64A having a touch screen display adapted to allow interaction between the driver 56 and the system 11.

Figure 3:
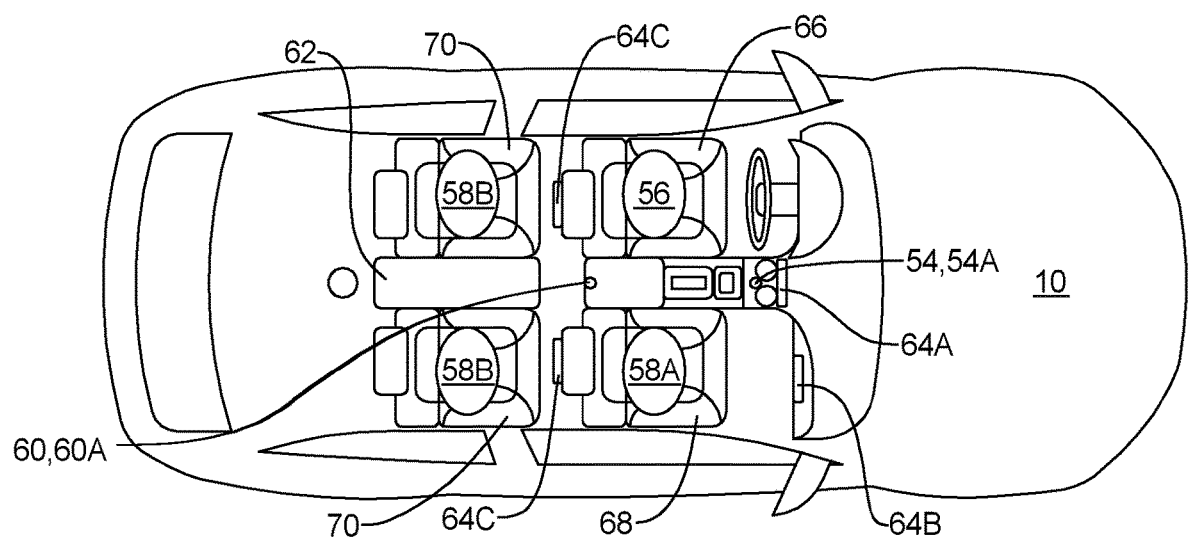
FIG. 3 is a schematic top view of a vehicle including a front seat actuator and a rear seat actuator for requesting initiation of an automated slowdown procedure.
Figure 4:
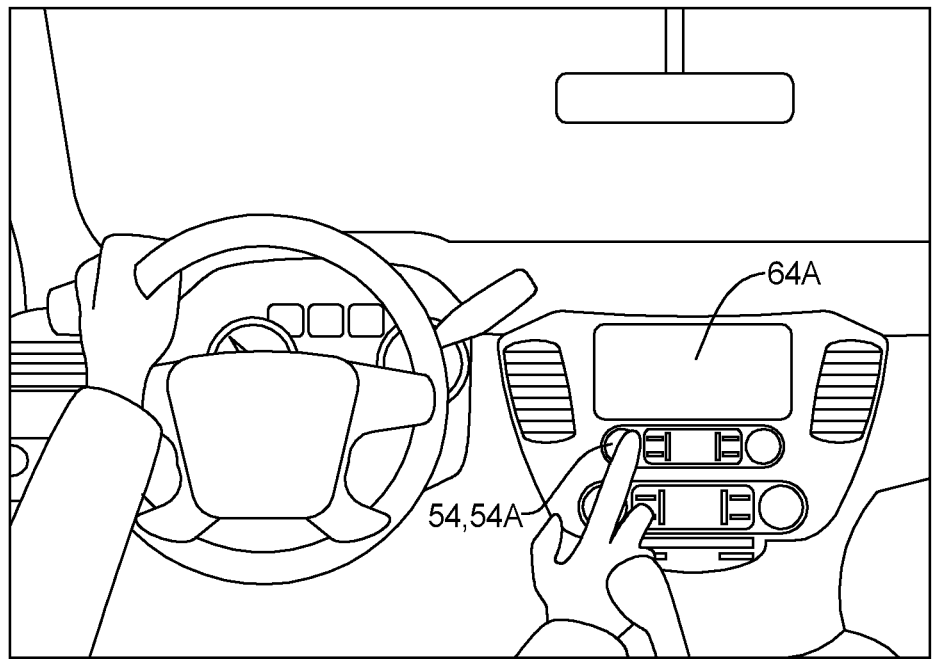
FIG. 4 is a schematic diagram of a dashboard of a vehicle having a system in accordance with the present disclosure, a front seat actuator and a driver HMI.

Referring to FIG. 3, an example of a vehicle 10 having a system 11 in accordance with the present disclosure is shown, wherein the vehicle 10 includes a driver seat 66 for the driver 56 of the vehicle 10, a front passenger seat 68 for the front passenger 58A of the vehicle 10, and two rear passenger seats 70 for two rear passengers 58B seated in the rear seating area 62 of the vehicle 10. In an exemplary embodiment, the vehicle 10 includes a front seat actuator 54 that is a mechanical button or knob 54A located centrally on the dashboard, armrest or headliner (as shown within FIG. 3 and FIG. 4, centrally on the dashboard) within the vehicle 10, wherein the front seat actuator 54, 54A is accessible by either the driver 56 or the front seat passenger 58A. The vehicle 10 further includes a rear seating area actuator 60 that is a mechanical button or knob 60A located centrally within the rear seating area 62, wherein the rear seating area actuator 60, 60A is accessible by any of the rear seat passengers 58B. The system controller 34A is adapted to receive, via the front seat actuator 54, a request for initiation of the slowdown procedure from at least one of the driver 56 of the vehicle 10 and the front seat passenger 58A of the vehicle 10, and to receive, via the rear seating area actuator 60, a request for initiation of the slowdown procedure from the at least one rear seat passenger 58B located in the rear seating area 62.

Figure 5:
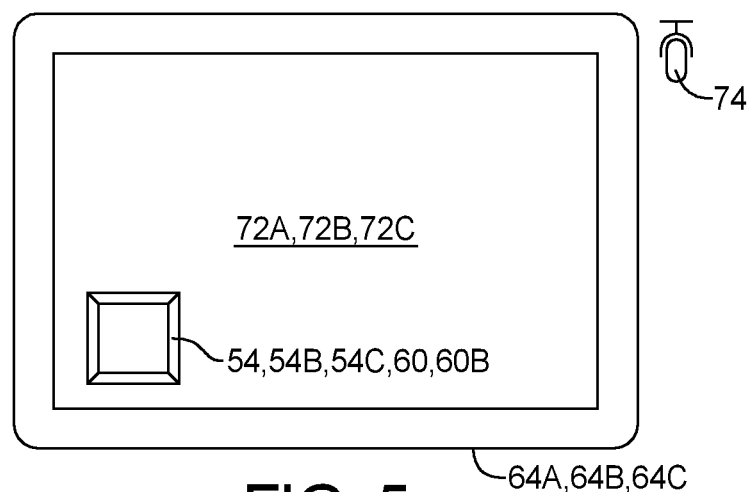
FIG. 5 is a schematic view of an HMI displaying an icon for either the front seat actuator or the rear seating area actuator according to an exemplary embodiment.

Referring to FIG. 5, in another exemplary embodiment, the front seat actuator 54 is an icon 54B or "soft button" displayed on the driver HMI 64A located centrally on the dashboard, wherein the front seat actuator 54, 54B is accessible by either the driver 56 or the front seat passenger 58A. Alternatively, the front seat actuator 54 includes the icon 54B displayed on a touch screen 72A of the driver HMI 64A, as discussed above, to allow the driver 56 to request an automated vehicle slowdown procedure, and the front seat actuator 54 further includes an icon 54C displayed on a touch screen 72B of a front seat passenger HMI 64B, to allow the front seat passenger 58A to request an automated vehicle slowdown procedure. The rear seating area 62 includes a rear seat passenger HMI 64C for each one of the rear seat passengers 58B, wherein the rear seating area actuator 60 includes an icon 60B displayed on a touch screen 72C of each one of the rear seat passenger HMIs 64C to allow each of the rear seat passengers 58B to request initiation of an automated vehicle slowdown procedure. It should be understood that FIG. 5 represents a schematic illustration representing each of the driver HMI 64A, the front seat passenger HMI 64B and each of the rear seat passenger HMIs 64C, wherein the displayed icons 54B, 54C, 60B for the front seat actuator 54 and the rear seating area actuator 60 are the same. It should be understood that the displayed icons 54B, 54C, 60B could be different without departing from the scope of the present disclosure.

In still another exemplary embodiment, each of the driver HMI 64A, the front seat passenger HMI 64B and the rear seat passenger HMIs 64C include a microphone 74 adapted to allow the driver 56, the front seat passenger 58A and the rear seat passengers 58B to provide verbal input to the system 11, and the microphone 74 acts as the front seat actuator 54 and rear seating area actuator 60 allowing the driver 56, front seat passenger 58A or rear passengers 58B to verbally request initiation of an automated vehicle slowdown procedure.

Figure 6:
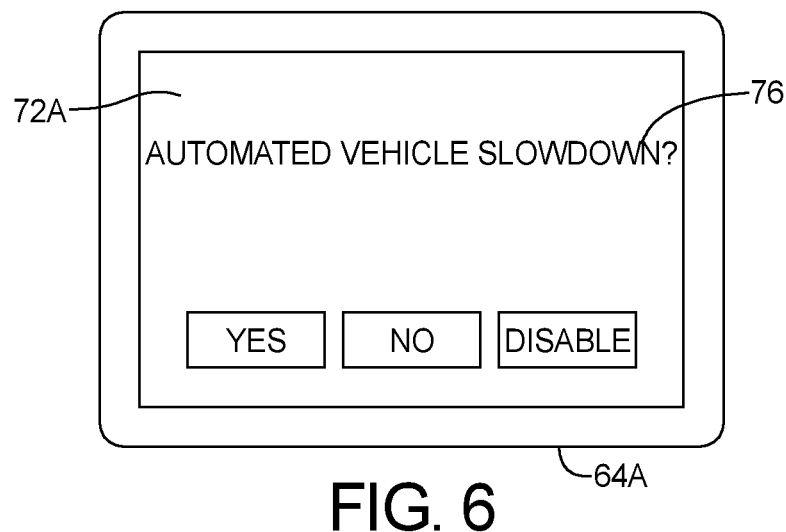
FIG. 6 is a schematic view of an HMI displaying a prompt for verification by the driver to initiate an automated slowdown procedure.

The system controller 34A detects when a request for an automated slowdown procedure has been requested by the driver 56 or the front seat passenger 58A, by actuating the front seat actuator 54, or by a rear seating area passenger 58B, by actuating the rear seating area actuator 60. When the system controller 34A detects that a request for an automated slowdown procedure has been requested, the system controller 34A, prompts the driver 56, via the driver HMI 64A, for verification to initiate the automated slowdown procedure. Referring to FIG. 6, in an exemplary embodiment, the system controller 34A displays a prompt 76 asking the driver 56 "Automated Vehicle Slowdown?", wherein the driver can respond to the prompt by selecting, by touching the touchscreen display 72A, either "YES", "NO" or "DISABLE". This provides an opportunity for the driver 56, upon seeing the prompt 76, to either verify, by selecting "YES", or deny, by selecting "NO", that the driver 56 wants to allow initiation of an automated slowdown procedure, in the event that the driver 56 requested the automated slowdown procedure, and to either verify, by selecting "YES", or deny, by selecting "NO", that the driver 56 wants to allow initiation of an automated slowdown procedure, in the even that the automated slowdown procedure was requested by the front seat passenger 58A or a rear seat passenger 58B. Further, the displayed prompt 76 provides the ability for the driver, upon seeing the prompt 76, to disable the system 11, denying the current request for an automated slowdown procedure and disabling the ability for further requests by selecting "DISABLE". Thus, if the driver 56 inadvertently actuates the front seat actuator 54, the displayed prompt 76 allows the driver 56 to cancel the request before the system controller 34A initiates the automated slowdown procedure. Further, if the driver 56 sees that a request has been made by another passenger 58A, 58B, the driver may realize that they are no longer able to properly operate the vehicle 10, and allow the automated slowdown procedure, or the driver 56 may not feel that the request was warranted and deny the request.

When the system controller 34A displays the prompt 76, if the system controller 34A does not receive, via the driver HMI 64A, a response from the driver 56 within a predetermined time frame, the system controller 34A will take the lack of response as acceptance of the request. Thus, the system controller 34A will proceed with initiation of an automated slowdown procedure upon the occurrence of either the driver 56 providing, via the driver HMI 64A, verification of acceptance to initiate the automated slowdown procedure, or when a response from the driver 56 is not received within a pre-determined time. For example, a rear seat passenger 58B requests an automated slowdown procedure and the system controller 34A displays, via the driver HMI 64A, a prompt 76 for verification by the driver 56. If the driver 56 does not see and respond to the prompt 76 within the predetermined time frame, for example 10 seconds, then the system controller 34A will proceed with initiation of the automated slowdown procedure.

Initiation of an automated slowdown procedure requires the system controller 34A to take control of the vehicle 10 away from the driver 56, and to operate the vehicle 10 autonomously. In an exemplary embodiment, the system controller 34A, prior to initiating the automated slowdown procedure, is adapted to engage an automated driving mode when the vehicle 10 is not already in an automated driving mode. When initiating, via the vehicle control module 52, the automated slowdown procedure, the system controller 34A is further adapted to actuate automated driving algorithms within the vehicle control module 52, disable driver control of the vehicle 10, and cause, with the vehicle control module 52, the vehicle 10 to slow down, maneuver off active lanes of a roadway on which the vehicle 10 is traveling and stop. Upon initiation of an automated slowdown procedure, the vehicle control module 52 is adapted to quickly and safely maneuver the vehicle 10 to a safe location by immediately causing the vehicle 10 to use automated driving algorithms such as, but not limited to adaptive cruise control (ACC) and lane keeping assistance (LKA) algorithms to maneuver the vehicle 10, for example, to the furthest right lane of a highway, and eventually, off to the shoulder of the highway and then bringing the vehicle 10 to a stop.

Figure 7:
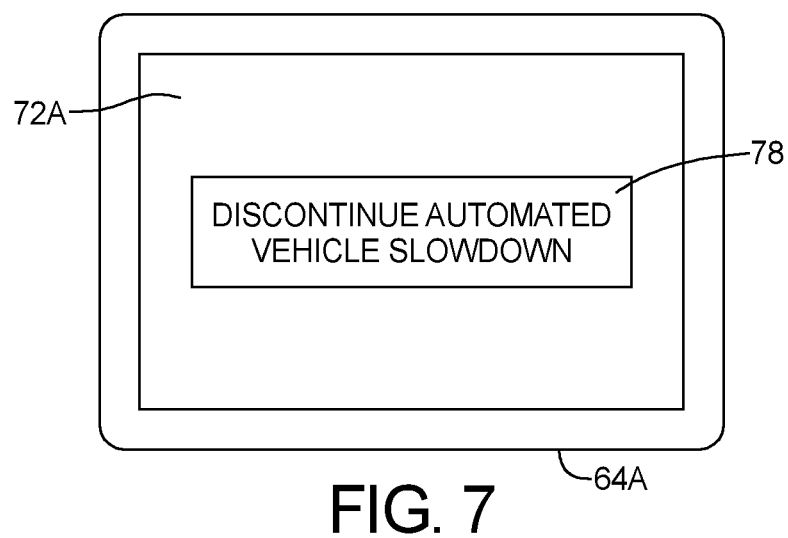
FIG. 7 is a schematic view of an HMI displaying an over-ride prompt for the driver.

In an exemplary embodiment, after initiating the automated slowdown procedure, the system controller 34A is further adapted to prompt, via the driver HMI 64A, the driver 56 of the vehicle 10 with an option to selectively over-ride the automated slowdown procedure. Referring to FIG. 7, for example, the system controller 34A displays an over-ride prompt 78 "Discontinue Automated Vehicle Slowdown", wherein, the driver 56 may selectively, by touching the prompt 78 on the touch screen display 72A of the driver HMI 64A, over-ride the automated slowdown procedure, wherein the system controller 34A will stop the automated slowdown procedure and return control of the vehicle 10 to the driver 56. As long as the driver 56 does not selectively over-ride the automated slowdown procedure, the system controller 34A will continue with the automated slowdown procedure.

In an exemplary embodiment, prior to detecting a request for initiation of an automated slowdown procedure, the system controller 34A is adapted to receive, via the driver HMI 64A, preferences from the driver 56 related to initiation of the automated slowdown procedure. Thus, the driver 56, can customize the system 11 as to when and how to allow initiation of automated slowdown procedures.

For example, the driver 56 may be traveling with young children seated in the rear seating area 62, and does not want them to be able to request initiation of an automated slowdown procedure. The driver may provide preferences that include disabling the rear seating area actuator 60. Thus, the young children seated within the rear seating area 62 of the vehicle 10 will not be able to request an automated vehicle slowdown procedure.

After receiving, via the driver HMI 64A, preferences from the driver 56 related to initiation of the automated slowdown procedure, the system controller 34A is further adapted to detect, with the occupant monitoring system 50, the presence and location of passengers 58A, 58B, in addition to the driver 56, within the vehicle 10, identify, with the occupant monitoring system 50, at least one rear seat passenger 58B located in the rear seating area 62 of the vehicle 10, and determine, based on preferences from the driver 56, eligibility of the at least one rear seat passenger 58B located in the rear seating area 62 of the vehicle 10 to request initiation of the automated slowdown procedure.

The occupant monitoring system 50 includes sensors known in the art to capture images of the rear seat passengers 58B and, using computer vision algorithms, identify the rear seat passengers 58B. Identification of the rear seat passengers 58B may include using computer vision algorithms to approximate an age of such rear seat passengers 58B, or by using computer vision algorithms in conjunction with machine learning algorithms and data of previous drivers 56 and passengers 58A, 58B, determining a specific identity of such rear seat passengers 58B.

Thus, in an exemplary embodiment, the driver 56 may provide preferences that include disabling the rear seating area actuator 60 for rear seat passengers 58B that are less than a certain age, for example, ten years old, wherein, the system controller 34A, using the occupant monitoring system 50, determines that the age of the rear seat passengers 58B is approximated to be less than ten years old and disables the rear seating area actuator 60. In another exemplary embodiment, the driver 56 may provide preferences that include disabling the rear seating area actuator 60 when the two young children (specifically, Johnny and Susie) are seated in the rear seating area 62. The system controller 34A, using the occupant monitoring system 50, identifies Johnny and Susie sitting in the rear seating area 62 and disables the rear seating area actuator 60.

Such preferences may be applied permanently, wherein the rear seating area actuator 60 is disabled until the driver 56 changes the preferences, or such preferences may apply only to the current ignition cycle of the vehicle 10, wherein the next time the vehicle 10 is used, such preferences no longer apply, and the system 11 will operate on default settings.

The system controller 34A is adapted to receive, via the front seat actuator 54, a request for initiation of the slowdown procedure from at least one of the driver 56 of the vehicle 10 and a front seat passenger 58A of the vehicle 10, and to receive, via the rear seating area actuator 60, a request for initiation of the slowdown procedure from the at least one rear seat passenger 58B located in the rear seating area 62 when the system controller 34A determines, based on preferences from the driver 56, that the at least one rear seat passenger 58B is eligible to request initiation of the automated slowdown procedure. Thus, in an exemplary embodiment, the driver 56 may provide preferences that include disabling the rear seating area actuator 60 for rear seat passengers 58B that are less than a certain age, for example, ten years old, wherein, the system controller 34A, using the occupant monitoring system 50, determines that the age of the rear seat passengers 58B is approximated to be more than ten years old and enables use of the rear seating area actuator 60 by such rear seat passengers 58B to request an automated slowdown procedure.

In various embodiments, the system controller 34A, via the driver HMI 64A, is adapted to receive preferences from the driver 56 related to initiation of the automated slowdown procedure including, but not limited to, at least one of disabling the rear seating area actuator 60, disabling both the rear seating area actuator 60 and the front seat actuator 54, disabling one or both of the front seat actuator 54 and the rear seating area actuator 60 for a single ignition cycle, or until the driver 56 changes the preferences, disabling the eligibility of a specific passenger, as identified by the occupant monitoring system 50, to initiate a request for the vehicle slowdown procedure, and disabling the eligibility of any passenger 58A, 58B that is less than a pre-set age.

Figure 8:
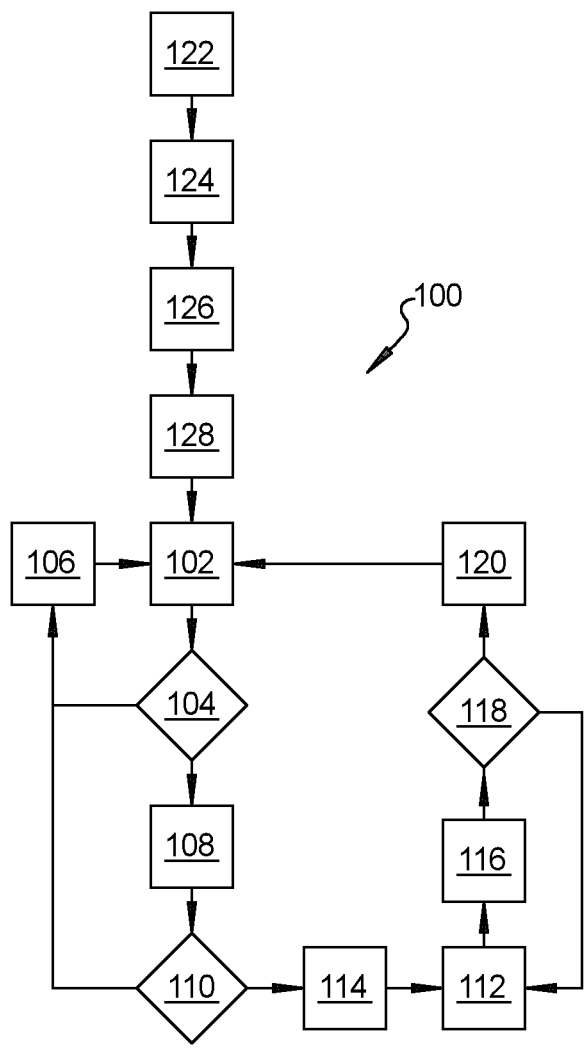
FIG. 8 is a flow chart illustrating a method of providing the ability for the driver or a passenger within the vehicle to initiate an automated vehicle slowdown procedure.
Figure 9:
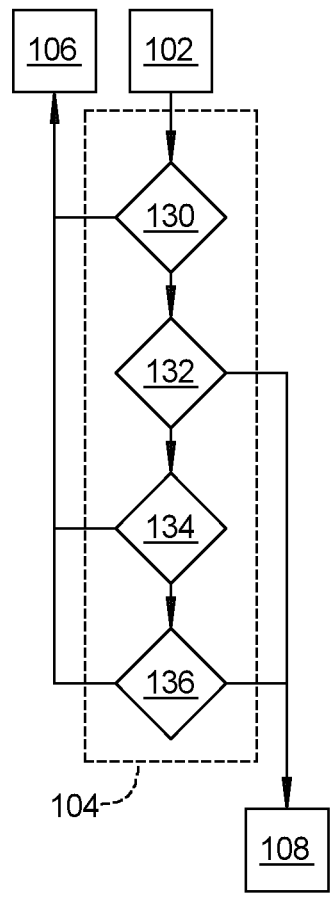
FIG. 9 is a flow chart illustrating an exemplary embodiment of the detecting, with the system controller, if a request for initiation of an automated slowdown procedure has been received by the system controller at block 104 of FIG. 8.
Figure 10:
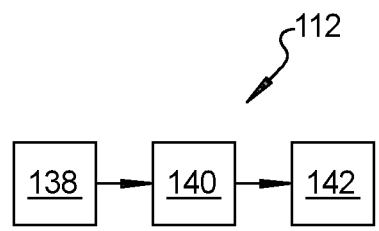
FIG. 10 is a flow chart illustrating an exemplary embodiment of the initiating, with the system controller, via the vehicle control module, the automated slowdown procedure at block 112 of FIG. 8.

Referring to FIG. 8 a method 100 of initiating an automated slowdown procedure within a vehicle 10 includes, beginning at block 102, providing, with a system controller 34A, control of the vehicle 10 to a driver 56 of the vehicle 10, wherein the driver 56 of the vehicle 10 proceeds with driving the vehicle 10, moving to block 104, detecting, with the system controller 34A, a request for initiation of an automated slowdown procedure, wherein, if, at block 104, the system controller does not detect a request for initiation of an automated slowdown procedure, then, moving from block 104 to block 106, no action is taken, and moving from block 106 to 102, control of the vehicle 10 remains with the driver 56, and if, at block 104, the system controller does detect a request for initiation of an automated slowdown procedure, then, moving from block 104 to block 108, the method 100 includes prompting, with the system controller 34A via a human machine interface (HMI) 64A, the driver 56 of the vehicle 10 for verification to initiate the automated slowdown procedure, and, moving to block 112, initiating, with the system controller 34A, via a vehicle control module 52, the automated slowdown procedure when, at block 110, the system controller determines that either one of 1) the driver 56 provides, via the HMI 64A, verification to initiate the automated slowdown procedure, or 2) a response from the driver 56 is not received within a pre-determined time.

In an exemplary embodiment, the method 100 further includes, at block 114, prior to initiating the automated slowdown procedure at block 112, engaging an automated driving mode when the vehicle 10 is not already in an automated driving mode.

In an exemplary embodiment, the method 100 further includes, after initiating the automated slowdown procedure at block 112, moving to block 116, prompting, with the system controller 34A, via the HMI 64A, the driver 56 of the vehicle 10 with an option to selectively over-ride the automated slowdown procedure, and moving to block 118, one of, moving from block 118 to block 112, continuing with the automated slowdown procedure when the driver 56 of the vehicle 10 does not selectively over-ride, via the HMI 64A, the automated slowdown procedure, or, moving from block 118 to block 120, returning, with the system controller 34A, control of the vehicle 10 to the driver 56 of the vehicle 10 when the driver 56 of the vehicle selectively over-rides, via the HMI 64A, the automated slowdown procedure.

In an exemplary embodiment, the method 100 further includes, prior to the providing, with the system controller 34A, control of the vehicle 10 to the driver 56 of the vehicle 10, and the driver 56 of the vehicle 10 proceeding with driving at block 102, moving to block 122, receiving, with the system controller 34A, via the HMI 64A, preferences from the driver 56 related to initiation of the automated slowdown procedure.

In an exemplary embodiment, the method 100 further includes, after receiving, with the system controller 34A, via the HMI 64A, preferences from the driver 56 related to initiation of the automated slowdown procedure at block 122, moving to block 124, detecting, with an occupant monitoring system 50, the presence and location of passengers 58A, 58B, in addition to the driver 56, within the vehicle 10, moving to block 126, identifying, with the occupant monitoring system 50, at least one passenger 58B located in a rear seating area 62 of the vehicle 10, and, moving to block 128, determining, with the system controller 34A, based on preferences from the driver 56, eligibility of the at least one passenger 58B located in the rear seating area 62 of the vehicle 10 to request initiation of the automated slowdown procedure.

In an exemplary embodiment, the detecting, with the system controller 34A, if a request for initiation of an automated slowdown procedure has been received by the system controller 34A at block 104 further includes, moving to block 130, detecting, with the system controller 34A, if the system 11 is in an active mode. If the system 11 is not active, then, moving from block 130 to block 106, no action is taken. If the system 11 is active, then the method further includes, moving from block 130 to block 132, receiving, with the system controller 34A, via the front seat actuator 54, a request for initiation of the slowdown procedure from at least one of the driver 56 of the vehicle 10 and the front seat passenger 58A of the vehicle 10. If at block 132, the system controller 34A receives, via the front seat actuator 54, a request for initiation of the slowdown procedure from at least one of the driver 56 of the vehicle 10 and the front seat passenger 58A of the vehicle 10, then the method progresses to block 108, where the driver 56 is prompted, with the system controller 34A via the human machine interface (HMI) 64A, for verification to initiate the automated slowdown procedure. If at block 132, the system controller 34A does not receive a request via the front seat actuator 54, then the method 100 further includes, moving from block 132 to block 134, receiving, with the system controller 34A, via a rear seating area actuator 60, a request for initiation of the slowdown procedure from the at least one passenger 58B located in the rear seating area 62. If, at block 134, no request is received from the rear seating area actuator 60, then, moving from block 134 to block 106, no action is taken. If at block 134, a request is received from the rear seating area actuator 60, then, moving from block 134 to block 136, the system controller 34A determines, based on preferences from the driver, eligibility of the at least one passenger 58B located within the rear seating area 60 to request initiation of the automated slowdown procedure. If at block 136, the system controller 34A determines, based on preferences of the driver 56, that the rear seat passenger 58B is not eligible to request an automated slowdown procedure, then, moving from block 136 to block 106, no action is taken. If at block 136, the system controller 34A determines, based on preferences of the driver 56, that the rear seat passenger 58B is eligible to request an automated slowdown procedure, then the method 100 proceeds to block 108, where the driver 56 is prompted, with the system controller 34A via the human machine interface (HMI) 64A, for verification to initiate the automated slowdown procedure.

In an exemplary embodiment, the initiating, with the system controller 34A, via the vehicle control module 52, the automated slowdown procedure at block 112, further includes, moving to block 138, actuating, with the system controller 34A, automated driving algorithms within the vehicle control module 52, moving to block 140, disabling driver control of the vehicle 10, and, moving to block 142, causing, with the vehicle control module 52, the vehicle 10 to slow down, maneuver off active lanes of a roadway on which the vehicle 10 is traveling, and stop.

A system and method of the present disclosure offers the advantage of allowing a driver 56 or passengers 58A, 58B within a vehicle 10 to request initiation of an automated slowdown procedure to autonomously maneuver the vehicle 10 off the roadway and bring the vehicle 10 to a stop.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of initiating an automated slowdown procedure within a vehicle, comprising:
receiving, with the system controller, via a driver human machine interface (HMI), preferences from the driver related to initiation of the automated slowdown procedure;
detecting, with an occupant monitoring system, the presence and location of passengers, in addition to the driver, within the vehicle;
identifying, with the occupant monitoring system, at least one passenger located in a rear seating area of the vehicle;
determining, with the system controller, based on the preferences from the driver, eligibility of the at least one passenger located in the rear seating area of the vehicle to request initiation of the automated slowdown procedure;
providing, with a system controller, control of the vehicle to a driver of the vehicle, wherein the driver of the vehicle proceeds with driving the vehicle;
detecting, with the system controller, a request for initiation of the automated slowdown procedure;
prompting, with the system controller via the driver HMI, the driver of the vehicle for verification to initiate the automated slowdown procedure; and
initiating, with the system controller, via a vehicle control module, the automated slowdown procedure when either one of:
the driver provides, via the driver HMI, verification to initiate the automated slowdown procedure; or
a response from the driver is not received within a pre-determined time.

2. The method of claim 1, further including, prior to initiating the automated slowdown procedure, engaging an automated driving mode when the vehicle is not already in an automated driving mode.

3. The method of claim 2, further including, after initiating the automated slowdown procedure:
prompting, with the system controller, via the driver HMI, the driver of the vehicle with an option to selectively over-ride the automated slowdown procedure, and one of:
continuing with the automated slowdown procedure when the driver of the vehicle does not selectively over-ride, via the driver HMI, the automated slowdown procedure; or
returning, with the system controller, control of the vehicle to the driver of the vehicle when the driver of the vehicle selectively over-rides, via the driver HMI, the automated slowdown procedure.

4. The method of claim 3, wherein the detecting, with the system controller, a request for initiation of an automated slowdown procedure further includes receiving, with the system controller, via a front seat actuator, a request for initiation of the slowdown procedure from at least one of the driver of the vehicle and a front seat passenger of the vehicle.

5. The method of claim 4, wherein the detecting, with the system controller, a request for initiation of an automated slowdown procedure further includes receiving, with the system controller, via a rear seating area actuator, a request for initiation of the slowdown procedure from the at least one passenger located in the rear seating area when the system controller determines, based on the preferences from the driver, that the at least one passenger located within the rear seating area is eligible to request initiation of the automated slowdown procedure.

6. The method of claim 5, wherein the receiving, with the system controller, via the driver HMI, the preferences from the driver related to initiation of the automated slowdown procedure further includes receiving preferences from the driver including at least one of:
   disabling the rear seating area actuator;
   disabling both the rear seating area actuator and the front seat actuator;
   disabling one or both of the front seat actuator and the rear seating area actuator for a single ignition cycle;
   disabling the eligibility of a specific passenger to initiate a request for the vehicle slowdown procedure; and
   disabling the eligibility of any passenger that is less than a pre-set age.

7. The method of claim 6, wherein the front seat actuator is at least one of:
   a mechanical actuator; and
   an icon presented on either one of the driver HMI and a front seat passenger HMI.

8. The method of claim 7, wherein the rear seating area actuator is at least one of:
   a mechanical actuator; and
   an icon presented on a rear seat passenger HMI.

9. The method of claim 8, wherein each of the driver HMI, the front seat passenger HMI and the rear seat passenger HMI includes a microphone adapted to receive verbal input to the system controller, the detecting, with the system controller, a request for initiation of an automated slowdown procedure further including receiving, with the system controller, a verbal request for initiation of the automated slowdown procedure via the microphone within one of the driver HMI, the front seat passenger HMI and the rear seat passenger HMI.

10. The method of claim 1, wherein the initiating, with the system controller, via the vehicle control module, the automated slowdown procedure further includes:
   actuating, with the system controller, automated driving algorithms within the vehicle control module;
   disabling driver control of the vehicle; and
   causing, with the vehicle control module, the vehicle to slow down, maneuver off active lanes of a roadway on which the vehicle is traveling, and stop.

11. A system for initiating an automated slowdown procedure within a vehicle, comprising:
   a system controller adapted to:
      receive, via a driver human machine interface (HMI), preferences from the driver related to initiation of the automated slowdown procedure and detect a request for initiation of the automated slowdown procedure;
      detect, with an occupant monitoring system, the presence and location of passengers, in addition to the driver, within the vehicle;
      identify, with the occupant monitoring system, at least one passenger located in a rear seating area of the vehicle;
      determine, based on the preferences from the driver, eligibility of the at least one passenger located in the rear seating area of the vehicle to request initiation of the automated slowdown procedure; and
      prompt, via the driver HMI, the driver of the vehicle for verification to initiate the automated slowdown procedure; and
   a vehicle control module, wherein the system controller is adapted to initiate, via the vehicle control module, the automated slowdown procedure when either one of:
      the driver provides, via the driver HMI, verification to initiate the automated slowdown procedure; or
      a response from the driver is not received within a pre-determined time.

12. The system of claim 11, wherein, prior to initiating the automated slowdown procedure, the system controller is adapted to engage an automated driving mode when the vehicle is not already in an automated driving mode.

13. The system of claim 12, wherein, after initiating the automated slowdown procedure, the system controller is further adapted to:
   prompt, via the driver HMI, the driver of the vehicle with an option to selectively over-ride the automated slowdown procedure, and one of:
      continue with the automated slowdown procedure when the driver of the vehicle does not selectively over-ride, via the driver HMI, the automated slowdown procedure; or
      return control of the vehicle to the driver of the vehicle when the driver of the vehicle selectively over-rides, via the driver HMI, the automated slowdown procedure.

14. The system of claim 13, wherein when detecting a request for initiation of an automated slowdown procedure, the system controller is further adapted to at least one of:
   receive, via a front seat actuator, a request for initiation of the slowdown procedure from at least one of the driver of the vehicle and a front seat passenger of the vehicle; and
   receive, via a rear seating area actuator, a request for initiation of the slowdown procedure from the at least one passenger located in the rear seating area when the system controller determines, based on the preferences from the driver, that the at least one passenger located within the rear seating area is eligible to request initiation of the automated slowdown procedure.

15. The system of claim 14, wherein the system controller, via the driver HMI, is adapted to receive the preferences from the driver related to initiation of the automated slowdown procedure including at least one of:
   disabling the rear seating area actuator;
   disabling both the rear seating area actuator and the front seat actuator;
   disabling one or both of the front seat actuator and the rear seating area actuator for a single ignition cycle;
   disabling the eligibility of a specific passenger to initiate a request for the vehicle slowdown procedure; and
   disabling the eligibility of any passenger that is less than a pre-set age.

16. The system of claim 15, wherein the front seat actuator is at least one of a mechanical actuator, and an icon presented on one of the driver HMI or a front seat passenger HMI.

17. The system of claim 16, wherein the rear seating area actuator is at least one of a mechanical actuator, and an icon presented on a rear seat passenger HMI.

18. The system of claim 17, wherein each of the driver HMI, the front seat passenger HMI and the rear seat passenger HMI includes a microphone adapted to receive verbal input to the system controller.

19. The system of claim 11, wherein when initiating, via the vehicle control module, the automated slowdown procedure, the system controller is further adapted to:
   actuate automated driving algorithms within the vehicle control module;
   disable driver control of the vehicle; and
   cause, with the vehicle control module, the vehicle to slow down, maneuver off active lanes of a roadway on which the vehicle is traveling and stop.

20. A vehicle having a system for initiating an automated slowdown procedure within a vehicle, comprising:
   a system controller in communication with a driver human machine interface (HMI), wherein, the system controller is adapted to receive, via the driver HMI, preferences from a driver related to initiation of the automated slowdown procedure;
   an occupant monitoring system in communication with the system controller, wherein, the system controller is adapted to detect, with the occupant monitoring system, the presence and location of passengers, in addition to the driver, within the vehicle, identify, with the occupant monitoring system, at least one passenger located in a rear seating area of the vehicle, and determine, based on preferences from the driver, eligibility of the at least one passenger located in the rear seating area of the vehicle to request initiation of the automated slowdown procedure;
   a front seat actuator adapted to allow a request for initiation of the automated slowdown procedure to be made by at least one of the driver of the vehicle and a front seat passenger, and a rear seating area actuator adapted to allow a request for initiation of the automated slowdown procedure to be made by the at least one passenger located in the rear seating area, the system controller adapted to detect a request for initiation of the automated slowdown procedure by at least one of the front seat actuator and the rear seating actuator;
   the system controller further adapted to:
   prompt, via the driver HMI, the driver of the vehicle for verification to initiate the automated slowdown procedure;
   engage an automated driving mode;
   initiate, via a vehicle control module, the automated slowdown procedure when either one of:
      the driver provides, via the driver HMI, verification to initiate the automated slowdown procedure; or
      a response from the driver is not received within a pre-determined time;
   prompt, via the driver HMI, the driver of the vehicle with an option to selectively over-ride the automated slowdown procedure, and one of:
      continue with the automated slowdown procedure when the driver of the vehicle does not selectively over-ride, via the driver HMI, the automated slowdown procedure; or
      return control of the vehicle to the driver of the vehicle when the driver of the vehicle selectively over-rides, via the driver HMI, the automated slowdown procedure.

* * * * *